United States Patent
Joshi et al.

(10) Patent No.: US 11,792,883 B2
(45) Date of Patent: Oct. 17, 2023

(54) ETHERNET PDU SERVICE FOR 5G NETWORKS

(71) Applicant: Verizon Patent and Licensing Inc., Basking Ridge, NJ (US)

(72) Inventors: Kiritkumar Joshi, Cupertino, CA (US); Jose M. Verger, Alamo, CA (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 234 days.

(21) Appl. No.: 17/388,481

(22) Filed: Jul. 29, 2021

(65) Prior Publication Data

US 2023/0033048 A1 Feb. 2, 2023

(51) Int. Cl.
*H04W 80/02* (2009.01)
*H04W 40/24* (2009.01)
*H04W 8/26* (2009.01)
*H04L 61/4552* (2022.01)
*H04L 101/668* (2022.01)

(52) U.S. Cl.
CPC ......... *H04W 80/02* (2013.01); *H04L 61/4552* (2022.05); *H04W 8/26* (2013.01); *H04W 40/248* (2013.01); *H04L 2101/668* (2022.05)

(58) Field of Classification Search
None
See application file for complete search history.

(56) References Cited

U.S. PATENT DOCUMENTS

| | | | |
|---|---|---|---|
| 11,665,630 B2* | 5/2023 | Evenden | H04W 48/16 370/338 |
| 2015/0195363 A1* | 7/2015 | Wei | H04L 61/2596 709/227 |
| 2016/0277497 A1* | 9/2016 | Bannister | H04L 67/1097 |
| 2018/0262428 A1* | 9/2018 | Chirreddy | H04L 61/5007 |
| 2019/0058731 A1* | 2/2019 | Garg | H04L 63/1466 |
| 2019/0104090 A1* | 4/2019 | Labonte | H04L 49/252 |
| 2021/0073017 A1* | 3/2021 | Lolage | H04L 61/58 |
| 2021/0314288 A1* | 10/2021 | Zhu | H04L 49/70 |
| 2022/0014519 A1* | 1/2022 | Sweeney | H04L 12/4641 |
| 2022/0021678 A1* | 1/2022 | Kreger-Stickles | H04L 63/101 |
| 2022/0417141 A1* | 12/2022 | Thoria | H04L 45/64 |
| 2023/0033048 A1* | 2/2023 | Joshi | H04L 61/4552 |

* cited by examiner

*Primary Examiner* — Otis L Thompson, Jr.

(57) ABSTRACT

An Ethernet protocol data unit (PDU) over 5G service is provided. A network device in a core network stores addresses of advertised subnets, associated with multiple user equipment or customer premises equipment (UE/CPE) devices, in a subnet table that correlates a MAC address of each of the multiple UE/CPE devices to a subnet address. The network device receives an allocation and retention priority (ARP) request over a data link layer. The ARP request indicates an IP address for a target host of a data flow. The network device determines, based on the subnet table and the IP address, a MAC address of one UE/CPE device servicing the host address. The network device sends a directed ARP request to the UE/CPE device using the MAC address, receives in response a target MAC address for the target host, and sends a response to the ARP request with the target MAC address.

20 Claims, 8 Drawing Sheets

ETHERNET PDU SERVICE FOR 5G NETWORKS

BACKGROUND

Fifth Generation (5G) networks may use different frequencies, different radio access technologies, and different core network functions that can provide an improved experience over legacy wireless networks (e.g., Fourth Generation (4G) networks). Optimal uses of new features available through 5G networks continue to be explored.

DETAILED DESCRIPTION OF EXAMPLE EMBODIMENTS

Figure 1:
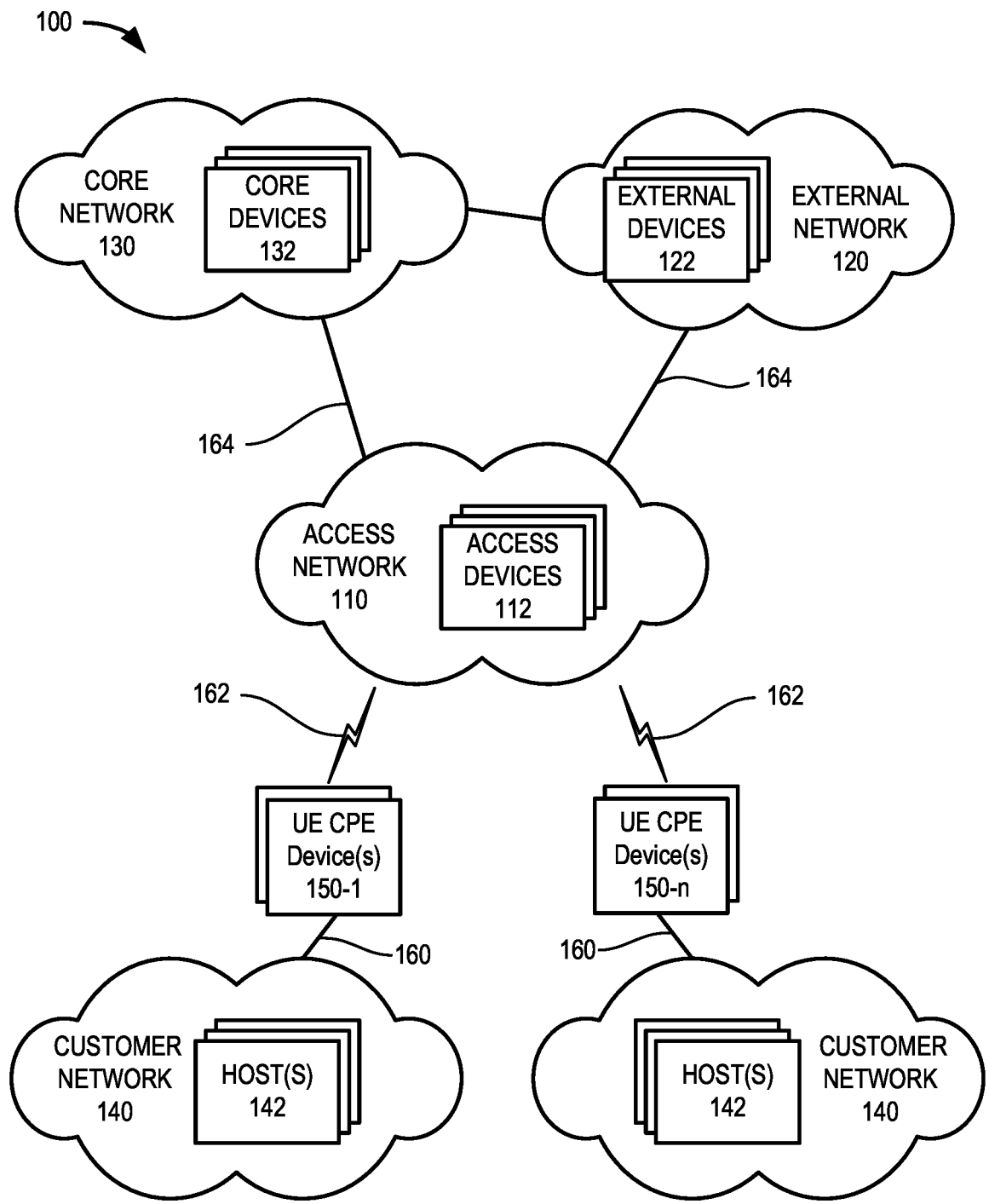
FIG. 1 is a diagram illustrating an exemplary environment in which an exemplary embodiment of an Ethernet protocol data unit (PDU) over 5G service may be implemented.

The following detailed description refers to the accompanying drawings. The same reference numbers in different drawings may identify the same or similar elements. Also, the following detailed description does not limit the invention.

5G New Radio (NR) technology may provide significant improvement in bandwidth and/or latency over other wireless network technology. The 5G NR air interface may include a high bandwidth that provides high data throughput in comparison to the data throughput of a Fourth Generation (4G) Long Term Evolution (LTE) air interface. To take advantage of the high bandwidths available via the 5G NR air interface, a provider of communication services may deploy fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) connected to an optical fiber, etc.), a FWA device may connect a customer to a network through one or more base stations via wireless over the air (OTA) signals. The FWA device may function as a user equipment (UE) device with respect to the one or more base stations. Thus, a FWA device may be installed in a fixed location at the customer premises associated with a customer, such as a residential house, an apartment building, an office building, etc.

Ethernet is commonly used in wired local area networks (LANs) for fast, secure connections. Systems communicating over Ethernet divide a stream of data into frames. Ethernet provides services for Open Systems Interconnection (OSI) Layer 2 (e.g., the data link layer of the OSI model). When data passes through a Layer 2 network, it is forwarded by a Layer 2 switch. This switch can "broadcast" frames extremely quickly to all Media Access Control (MAC) addresses registered on the Layer 2 switch, providing rapid networking for offices and organizations. However, this broadcast model also means that Layer 2 networks can become heavily congested, potentially limiting their size.

To avoid this congestion (among other reasons), wireless connections for UE devices (including FWA devices) typically rely on Internet Protocol (IP) addresses used in Layer 3, not MAC addresses. The IP addresses allow devices to communicate with computers outside their home networks, via the Internet. Instead of frames, Layer 3 deals exclusively with packets, which are transported via path determination and logical addressing. Thus, information entering and passing through Layer 3 networks is not broadcast to all devices on the network as with Layer 2 networks. Instead, data can be precisely transported to specific IP addresses. However, the use of Layer 3 protocols can increase complexity and costs of the network devices that support these protocols.

Systems and methods described herein provide for sending Ethernet protocol data units (PDUs) over 5G-NR. The service, referred to herein as Ethernet PDU over 5G service, uses provisioned FWA devices (e.g., UE devices with Layer 2 functionality) to transmit Ethernet frames over a 5G NR interface, along with directed control plane signaling from the core network to identify a MAC address of a target host device. The directed signaling reduces conventional broadcasts of MAC address, which can over burden a wireless network, and enables efficient transmission of Ethernet frames.

According to an implementation, a network device in a core network may store addresses of advertised subnets that are associated with multiple UE-type devices configured as customer premises equipment (CPE). The storing creates a subnet table that correlates a MAC address of each of the multiple UE/CPE devices to one or more subnet addresses. The network device may receive an allocation and retention priority (ARP) request over a data link layer (e.g., Layer 2). The ARP request may indicate an IP address for a target host of a data flow. The network device may determine, based on the subnet table and the IP address, a MAC address of one UE/CPE device servicing the host address. The network device may send a directed ARP request to the UE/CPE device using the MAC address, receive in response a target MAC address for the target host, and send a response to the ARP request with the target MAC address.

FIG. 1 is a diagram illustrating an exemplary environment 100 in which an embodiment of the Ethernet PDU over 5G service may be implemented. As illustrated, environment 100 includes access network 110, an external network 120, and a core network 130. Access network 110 includes access devices 112 (also referred to individually or generally as access device 112). External network 120 includes external devices 122 (also referred to individually or generally as external device 122). Core network 130 includes core devices 132 (also referred to individually or generally as core device 132). Environment 100 further includes one or more customer networks 140 connected to access network 110 via user equipment/customer premises equipment devices (UE/CPE devices) 150-1 through 150-n (also referred to individually or generally as UE/CPE device 150). Each customer network 140 includes one or more hosts 142.

The number, type, and arrangement of networks illustrated in environment 100 are exemplary. For example, according to other embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of UE/CPE devices 150 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between UE/CPE devices 150 and the network/network devices. Environment 100 may be implemented to include wired, optical, and/or wireless communication links. For example, communication links 160 may include a wired Ethernet connection or a WiFi connection; communication links 162 may include a wireless cellular (e.g., 5G-NR) connection; and communication links 164 may include a wired backhaul link. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 110 may include one or multiple networks of one or multiple types and technologies. For example, access network 110 may be implemented to include a 5G-radio access network (5G-RAN), a future generation RAN (e.g., a 6G-RAN or subsequent generation RAN). Access network 110 may also include a legacy RAN (e.g., a Third Generation (3G) RAN, a 4G or 4.5 RAN, etc.). Access network 110 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an open RAN (O-RAN) network, a virtualized RAN (vRAN), a self-organizing network (SON), a wired network (e.g., optical, cable, etc.), an optical network, or another type of network that provides access to or can be used as an on-ramp to access network 110, external network 120, and/or core network 130.

Access network 110 may include different and multiple functional splitting, such as options 1, 2, 3, 4, 5, 6, 7, or 8 that relate to combinations of access network 110 and core network 130 including an Evolved Packet Core (EPC) network and/or a Next Generation Core (NGC) network, or the splitting of the various layers (e.g., physical layer, MAC layer, data link layer, etc.), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) NR, standalone (SA) NR, etc.).

According to some exemplary embodiments, access network 110 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 110 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum), and/or other attributes or technologies used for radio communication.

Depending on the implementation, access network 110 may include one or multiple types of network devices, such as access devices 112. For example, access device 112 may include a next generation Node B (gNB), an evolved Long Term Evolution (eLTE) eNB, an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of Layer 3 network device. Additionally, or alternatively, access device 112 may include a wired and/or optical device (e.g., modem, wired access point, optical access point, Ethernet device, etc.) that provides network access. According to some exemplary implementations, access device 112 may include a combined functionality of multiple RATs (e.g., 4G and 5G functionality, 5G and 5.5G functionality, etc.) via soft and hard bonding based on demands and needs. According to some exemplary implementations, access device 112 may include an integrated functionality, such as a CU-CP and a CU-UP, or other integrations of split RAN nodes. Access device 112 may be an indoor device or an outdoor device.

External network 120 may include one or multiple networks of one or multiple types and technologies. For example, external network 120 may be implemented to include a service or an application-layer network, a cloud network, a private network, a public network, a multi-access edge computing (MEC) network (also known as a mobile edge computing network), a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an application, service, or asset (also referred to as an "application service").

Depending on the implementation, external network 120 may include various network devices such as external devices 122. For example, external devices 122 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 122 may host one or multiple types of application services. An application service may or may not pertain to the blocking delivery service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet-of-Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., SMS, MMS, etc.), voice, conferencing, instant messaging), video streaming, and/or other types of wireless application services.

Core network 130 may include one or multiple networks of one or multiple network types and technologies. Core network 130 may include a complementary network of access network 110. For example, core network 130 may be implemented to include an NGC network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network.

Depending on the implementation of core network 130, core network 130 may include various types of network devices that are illustrated in FIG. 1 as core devices 132. For example, core devices 132 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, and/or an application function (AF). According to other exemplary implementations, core devices 132 may include additional, different, and/or fewer network devices than those described. For example, core devices 132 may include a non-standard or a proprietary network device, and/or another type of network device that may be well-known but not particularly mentioned herein. Core devices 132 may also include a network device that provides a multi-RAT functionality (e.g., 4G and 5G, 5G and 5.5G, 5G and 6G, etc.), such as a UPF with Packet Data Network Gateway (PGW) user plane functionality (e.g., UPF+PGW-U), and/or other combined nodes.

Customer network 140 may include a Layer 2 and/or Layer 3 local area network (LAN), a wide area network (WAN), an enterprise network, or a combination of networks associated with a customer of access network 110.

Host 142 may include a server, client, or end device that has computational and/or communication capabilities (e.g., wireless, wired, optical, etc.). Host 142 may be implemented as a mobile device, a portable device, a stationary device (e.g., a non-mobile device), a device operated by a user, or a device not operated by a user. For example, host 142 may be implemented as a computer, a tablet, a netbook, a gaming device, an IoT device, a smart device, a smartphone, a mobile phone, a personal digital assistant, a wearable device (e.g., a watch, glasses, etc.), a music device, or other type of wired or wireless device. Host 142 may be configured to execute various types of software (e.g., applications, programs, etc.). The number and the types of software may vary among hosts 142. Hosts 142 may have at least one unique MAC address (typically used for Layer 2 communications) and an assigned IP address (typically used for Layer 3 communications).

UE/CPE devices 150 may provide an interface (e.g., links 160 and 162) between access devices 112 and hosts 142. In one implementation, UE/CPE 150 may be a type of FWA device. UE/CPE devices 150 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, UE/CPE devices 150 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of UE/CPE device 150 may vary among UE/CPE devices 150.

According to an exemplary embodiment, UE/CPE devices 150 may be used to implement Ethernet PDU over 5G services, as described herein. In one implementation, each UE/CPE device 150 may be provisioned/configured by a telecommunication service provider to support a customer (e.g., a business with multiple remote users). A customer may have multiple UE/CPE devices 150 at different locations, for example, with each UE/CPE device 150 supporting hosts 142 in one or more subnets. In other implementations, UE/CPE devices 150 may support multiple customers and maintain Layer 2 separation. Layer 2 separation may correspond to maintaining Layer 2 traffic associated with a first customer separate from Layer 2 traffic associated with a second customer. Layer 2 separation may be accomplished by assigning particular virtual LAN identifiers (VLAN IDs) to particular customers and tagging Layer 2 PDUs (e.g., Ethernet frames) with particular VLAN IDs. According to implementations described herein, UE/CPE devices 150 may be configured to wirelessly transmit frames over a data link layer (e.g., OSI Layer 2) without requiring packet transmission capabilities (e.g., for OSI Layer 3).

Figure 2:
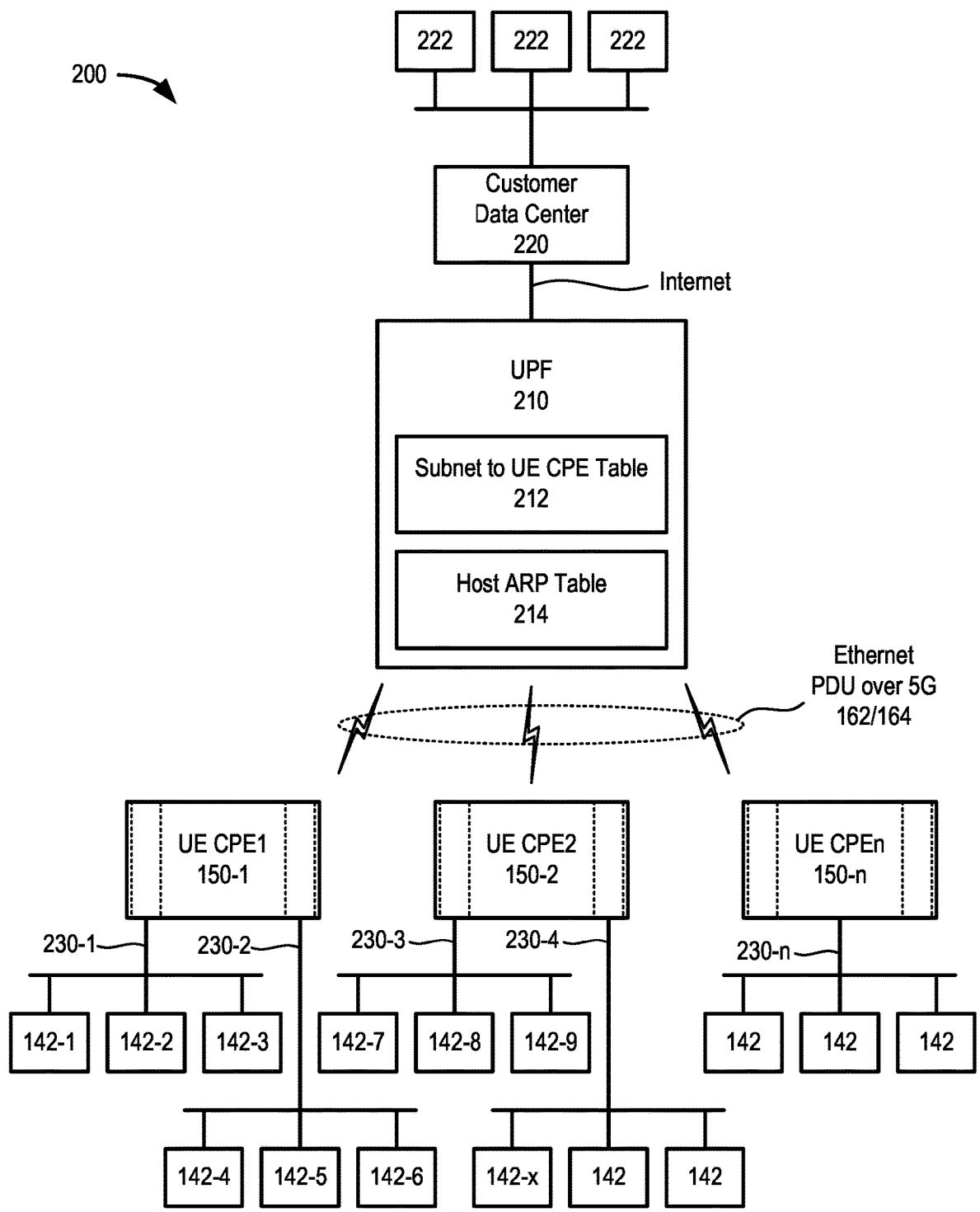
FIG. 2 is a diagram illustrating another exemplary environment in which an embodiment of the Ethernet PDU over 5G service may be implemented.

FIG. 2 is a diagram illustrating another exemplary environment 200 in which an embodiment of Ethernet PDU over 5G services may be implemented. According to this example, the Ethernet PDU over 5G service supports a spoke-to-hub and spoke-to-spoke communications. As illustrated, environment 200 includes hosts 142, UE/CPE devices 150-1 through 150-n, a UPF 210, and a customer data center 220. Customer data center 220 may include multiple application servers 222. UE/CPE devices 150-1 through 150-n (also referred to generically as UE/CPE 150) may be installed at one or more customer branch sites (e.g., sites associated with the same business entity as customer data center 220).

According to an implementation, UPF 210 may correspond to one of core devices 132. More particularly, UPF 210 may maintain an external PDU point of interconnect to a particular data network (e.g., external network 120/customer data center 220). For example, UPF 210 may be assigned a private Access Point Name (APN) for customer data center 220 or a semi-private APN for multiple customers. UPF 210 may also maintain an anchor point for intra/inter-RAT mobility, perform packet routing and forwarding, perform the user plane part of policy rule enforcement, perform packet inspection, perform lawful intercept, perform traffic usage reporting, perform quality-of-service (QoS) handling in the user plane, perform uplink traffic verification, perform transport level packet marking, perform downlink packet buffering, and/or perform other types of user plane processes.

Data center 220 may correspond to an external network 120, and application servers 222 may correspond to external devices 122. Application servers 222 may provide a variety of application services to hosts 142. Application servers 222 may be connected to different subnetworks (or subnets) associated with data center 220. Data center 220 may service one or more branch sites of the customer, such as branch sites including UE/CPE 150-1, 150-2, etc.

Hosts 142 may be connected to different subnets (referred to generally as subnets 230) associated with each UE/CPE 150. For example, each of hosts 142 may have a direct or indirect wired Ethernet connection to a corresponding UE/CPE 150. Each UE/CPE 150 may be provisioned (e.g., by a service provider of access network 110) with identifiers for one or more subnets 230. Subnets 230 behind (or located upstream of) the UE/CPE 150 may be advertised (e.g., via out-of-band/control plane signaling) to the UPF 210, by each of UE/CPE 150-1 through 150-n. According to an implantation, a special MAC address (e.g., a dedicated MAC addresses) may be assigned for both UE/CPE 150 and UPF 210 to enable advertising the subnets.

UE/CPE 150 device can host one or more subnets 230. For the same customer, these subnets are not overlapping. Using the configuration of FIG. 2, UE/CPE 150 may provide only Layer 2 functions. That is, in some implementations, UE/CPE 150 may not support Layer 3 protocols, such as IP. Hence the UE/CPE 150 may be an inexpensive device (e.g., a very cost effective Layer 2 switch).

Figure 5A:
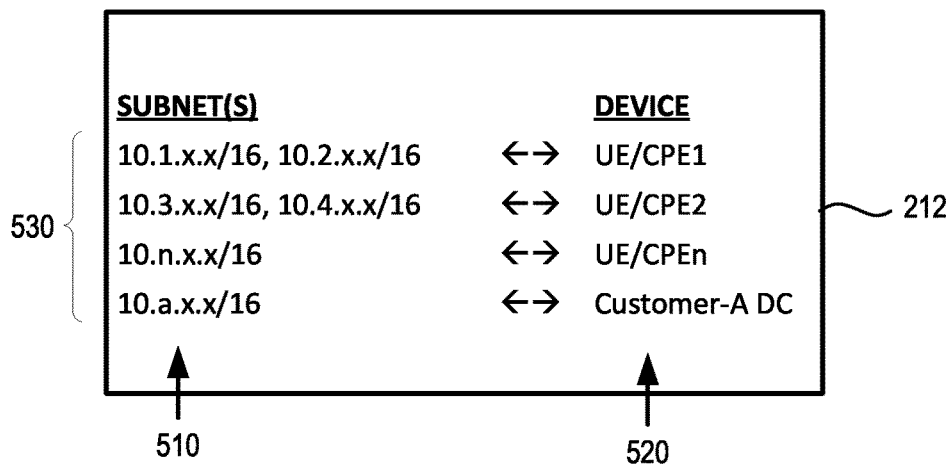
FIGS. 5A-5C are diagrams illustrating exemplary tables that may be stored by a user plane function (UPF) implementing the Ethernet PDU over 5G service.

As a result of the advertised subnets, UPF 210 may obtain reachability information for each of subnets 230, via their respective UE/CPEs 150. According to an implementation, UPF 210 may maintain a table 212 associating subnets 230 with particular UE/CPEs 150. Table 212 is illustrated in FIG. 5A. As shown in FIG. 5A, table 212 may include a subnet field 510, a device field 520, and a variety of entries 530 for fields 510 and 520. Table 212 may be unique to a particular customer/APN. Subnet field 510 may indicate a network address of each subnet 230 located upstream from a particular UE/CPE 150 or data center for the customer. Device field 520 may indicate the UE/CPE DEVICE or data center associated with each corresponding subnet(s) 230. Entries 530 for table 212 may be generated/updated by UPF 210 based on advertised information from each UE/CPE 150. In the case of a data center, subnets located upstream from data center 220 may be provisioned at configuration or advertised similar to UE/CPEs 150.

Figure 3:
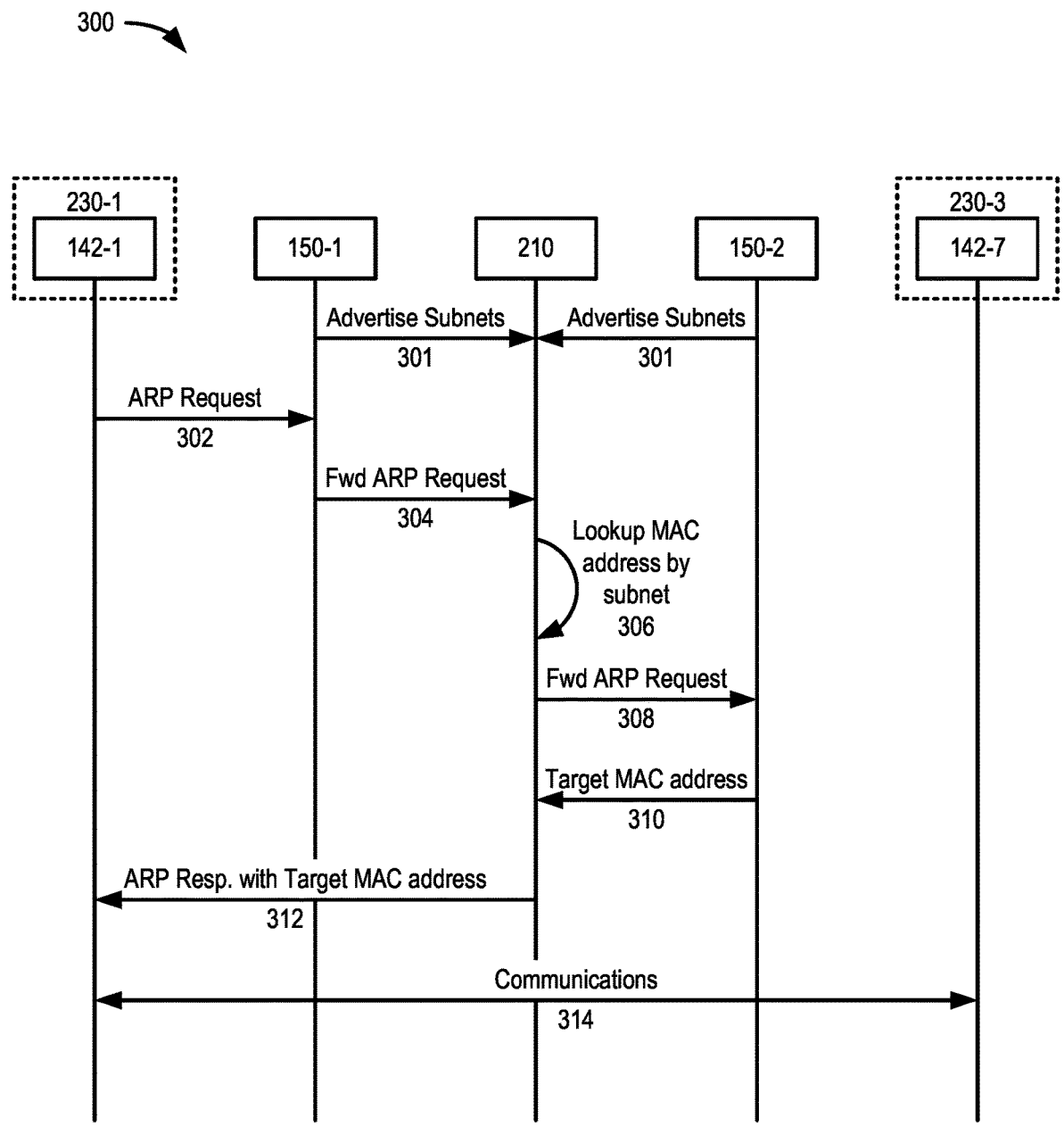
FIG. 3 is a diagram illustrating exemplary communications in an embodiment of the Ethernet PDU over 5G service.

FIG. 3 is a diagram illustrating exemplary communications for implementing Ethernet PDU over 5G services in a portion 300 of network environment 200. FIG. 3 illustrates communications between different hosts 142 in network portion 300. In other implementations, similar signaling may be used to establish communications between a host 142 and an application server 222 in data center 220. FIG. 3 provides simplified illustrations of communications in network portion 300 and is not intended to reflect every signal or communication exchanged between devices/functions. As shown in FIG. 3, network portion 300 may include host 142-1, UE/CPE 150-1, UPF 210, UE/CPE 150-2, and host 142-7.

As shown in FIG. 3, UE/CPE 150-1 and UE/CPE 150-2 may advertise 301 to UPF 210 addresses of their respective subnets 230. For example, each UE/CPE 150 may be provisioned with the MAC address of UPF 210 to facilitate direct out-of-band communications for sending respective subnet addresses to UPF 210.

For the purpose of admission control, an ARP data element may be used to indicate a priority level for the allocation and retention of service data flows. A mobile network may use the ARP to determine whether to accept a request to establish a service data flow or reject the request when resources are limited. As shown in FIG. 3, host 142-1 may send an ARP request 302 to UE/CPE 150-1 to establish a connection with host 142-7. The ARP request may include the IP address of destination host 142-7, which may identify the particular subnet of destination host 142-7. Assuming UE/CPE 150-1 does not have the destination MAC address for the given IP destination address/host 142-7. UE/CPE 150-1 may forward the ARP request to UPF 210 using the preconfigured MAC address for the customer APN, as shown at reference 304. For example, UE/CPE 150-1 may send ARP request 304 (e.g., including an IP address with an ID for subnet 230-3) via access network 110 and core network 130 to UPD 210 using Ethernet.

UPF 210 may receive ARP request 304. From the requested ARP, UPF 210 may derive a MAC address for the IP address of host 142-7 using Subnets to UE/CPE table 212. More particularly, as shown in FIG. 3, UPF 210 may determine from table 212 the UE/CPE 150 (e.g., UE/CPE 150-2) that hosts the particular subnet for host 142-7 (e.g., subnet 230-3). Using the MAC address for UE/CPE 150-2, UPF 210 may provide a directed ARP request 308 to UE/CPE 150-2. Without this mechanism (e.g., Subnets to UE table 212), UPF 210 would have to do a broadcast transmission (sending the ARP to each UE/CPE 150) for each of the ARP request, which would unnecessarily increase the traffic over access network 110, and also increase the workload on UPF 210.

In response to ARP request 308, UE/CPE 150-2 may provide to UPF 210 the target MAC address 310 for host 142-7. According to an implementation, UPF 210 may maintain Hosts ARP Table 214 to match each learned host 142 to its corresponding MAC address. Thus, UPF 210 may be able to eliminate communications 306 through 310 for some subsequent ARP requests.

Figure 5B:
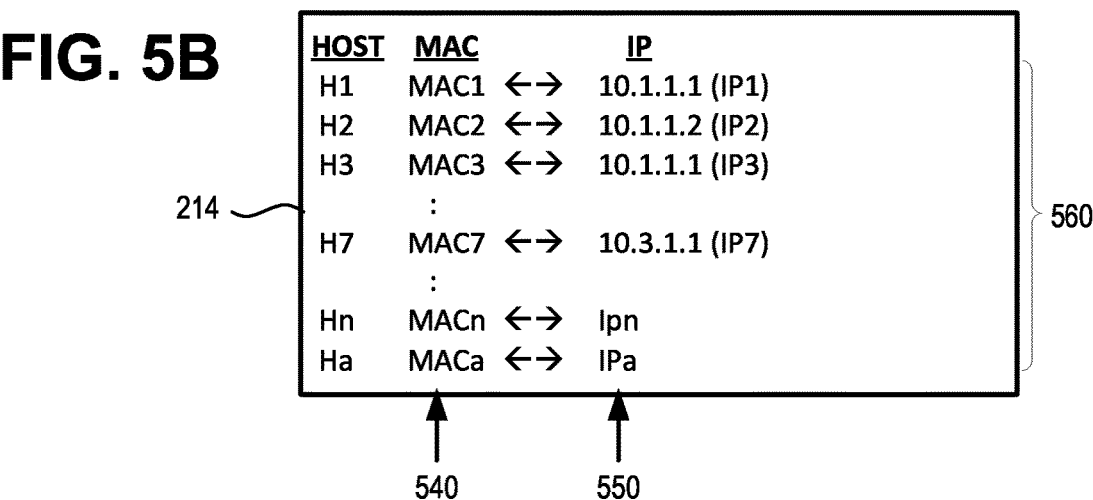

Table 214 is illustrated in FIG. 5B. As shown in FIG. 5B, table 214 may include a MAC address field 540, an IP addresses field 550, and a variety of entries 560 for fields 540 and 550. Table 214 may be unique to a particular customer/APN or shared among multiple customers using a common (semi-private) APN. MAC address field 540 may indicate a MAC address of a host 142/server 222 located upstream from a particular UE/CPE 150 or data center 220 for the customer. IP address field 550 may indicate a corresponding IP address for the particular host 142/server 222. Entries 560 for table 214 may be generated/updated by UPF 150 based on responses from each UE/CPE 150. In the case of a data center 220, MAC addresses for servers 222 may be provisioned at configuration or obtained similar to hosts 142 from UE/CPEs 150. According to an implementation, entries 560 in Hosts ARP Table 214 may be given an expiration period to maintain updated assignments.

Returning to FIG. 3, having obtained the target MAC address 310 from UE/CPE 150-2, UPF 210 may forward the MAC address of host 142-7 to the requesting UE/CPE 150-1/host 142-1, as indicated at reference 312. Host 142-1 may then initiate communications 314 to host 142-7 over access network 110 using Ethernet protocols. More particularly, host 142-1 may broadcast Ethernet frames with the MAC address of host 142-7 to UE/CPE 150-1 (e.g., via a wired communication link 160). UE/CPE 150-1 may send the Ethernet frames to UPF 210 (e.g., via a 5G NR communication link 162 to one of access device 112 and a wired backhaul communications link 164 to UPF 210). UPF 210 may forward the Ethernet frames to UE/CPE 150-2 (e.g., via a wired backhaul communications link 164 to one of access devices 112 and a 5G NR communication link 162 to UE/CPE 150-2). UE/CPE 150-2 may receive the Ethernet frames and broadcast them to host 142-7.

Figure 4:
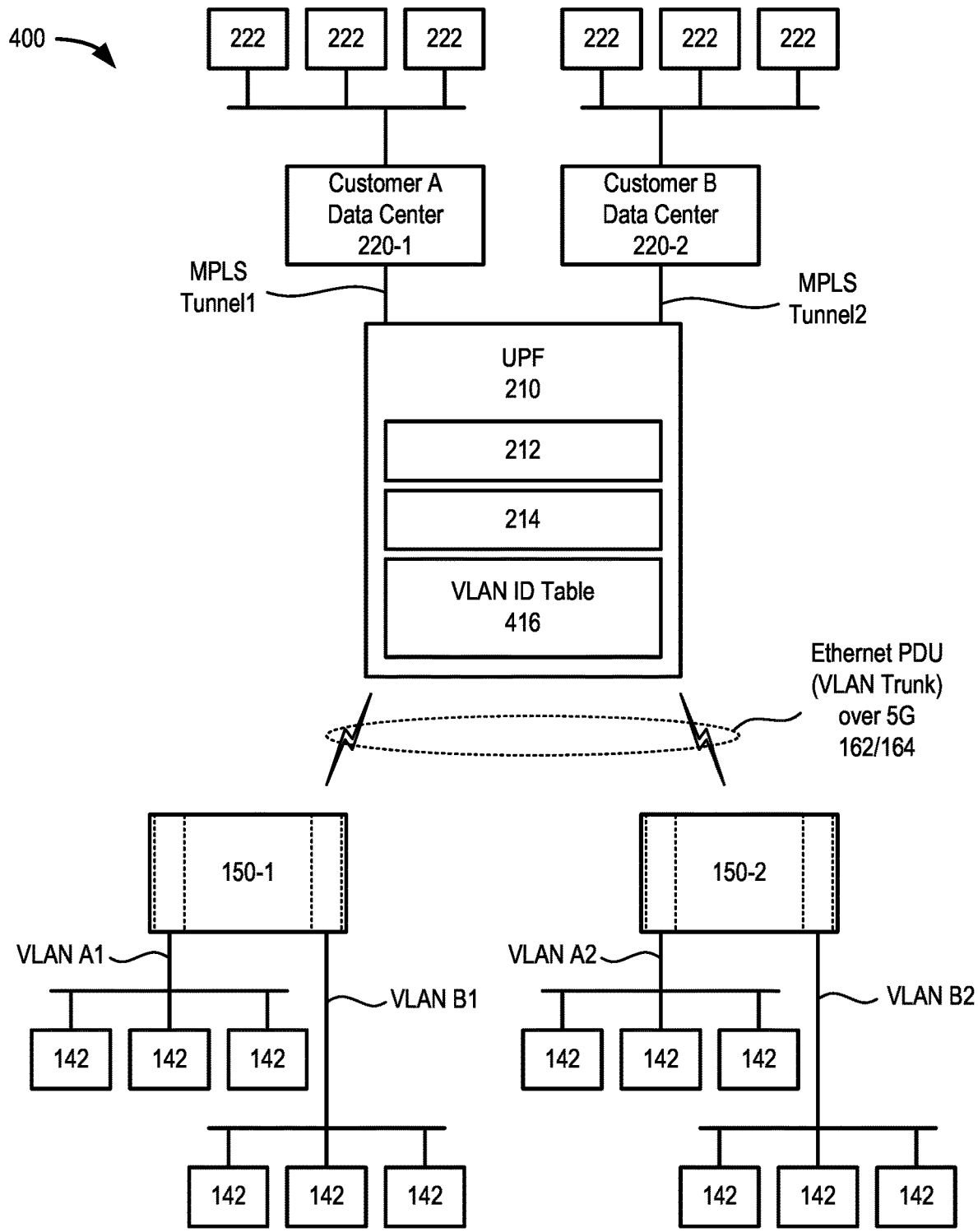
FIG. 4 is a diagram illustrating another exemplary environment in which an embodiment of the Ethernet PDU over 5G service may be implemented.

FIG. 4 is a diagram illustrating another exemplary environment 400 in which an embodiment of Ethernet PDU over 5G services may be implemented. According to the example of FIG. 4, the Ethernet PDU over 5G service uses a shared UE/CPE 150 between multiple customers to support spoke-to-hub and spoke-to-spoke communications. As illustrated, environment 400 includes hosts 142, UE/CPE 150-1 and 150-2, a UPF 210, and customer data centers 220-1 and 220-2. Customer data centers 220 may each include multiple application servers 222. UE/CPE 150-1 and 150-2 may be installed at locations that can be accessed by multiple customers (e.g., different private entities in a multi-tenant space).

The configuration of FIG. 4 may operate similarly to the implementation described above in connection with FIG. 2, with the additional capability to be able to share the UE/CPE 150 between two or more customers. UPF 210 may provide a common private APN for multiple customers (e.g., customer A and customer B) sharing one or more UE/CPE devices 150. This sharing is made possible by using a virtual LAN identifier (VLAN-ID) or similar field, which discriminates traffic of one customer from another. The VLAN-IDs may be managed and configured by the telecommunications service provider for access network 110, such that the Ethernet PDU over 5G service is a managed service. According to an implementation, UPF 210 may maintain a table 416 associating VLAN-IDs with particular customers using UE/CPEs 150. Table 416 is illustrated in FIG. 5C.

Figure 5C:
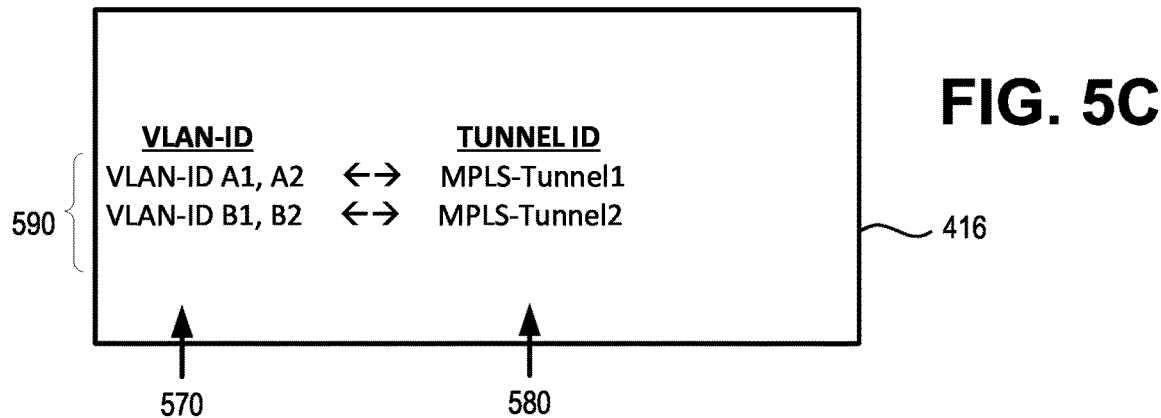

As shown in FIG. 5C, table 416 may include a VLAN-ID field 570, a tunnel ID field 580, and a variety of entries 590 for fields 570 and 580. Table 416 may be unique to a particular APN that is shared among multiple customers that use the same set of UE/CPE devices 150. VLAN-ID field 570 may indicate one or more virtual LANs associated with a customer using a shared UE/CPE 150. Tunnel ID field 580 may indicate a corresponding Multiprotocol Label Switching (MPLS) tunnel that is used to direct traffic from the customer VLAN(s) to the appropriate customer data center 220. According to an implementation, entries 590 for table 416 may be configured/provisioned by the telecommunications service provider using over-the-air (OTA) updates.

In the implementation of FIG. 4, UE/CPE 150 may include a VLAN-ID to differentiate traffic between customers sharing the same UE/CPE 150. UE/CPE 150 may essentially function as inexpensive Layer 2 switch. Furthermore, a single UE/CPE device may support multiple customers, without having to support more complex communications, such as IP virtual routing and forwarding (VRF) or IP tunneling technology.

Figure 6:
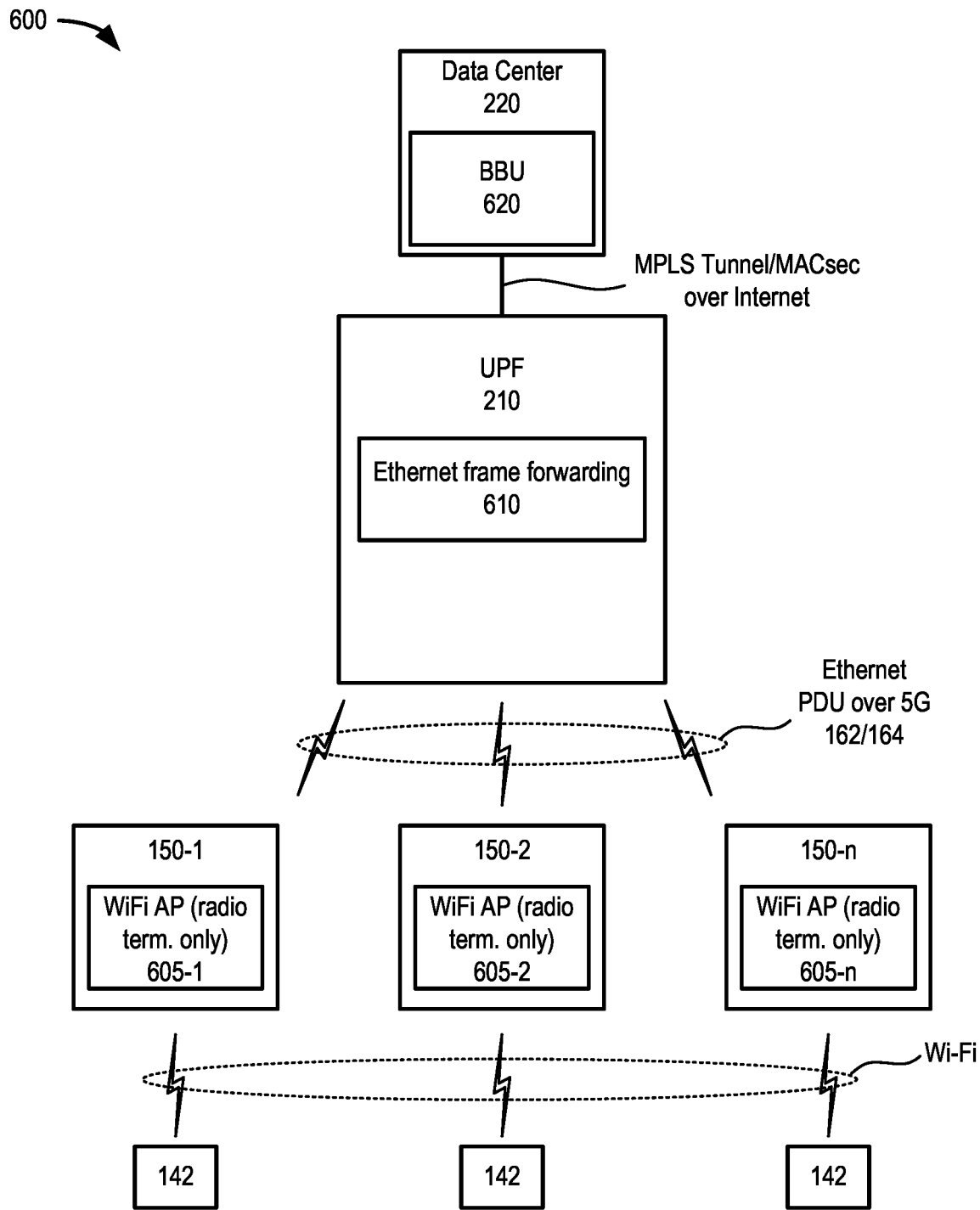
FIG. 6 is a diagram illustrating another exemplary environment in which an embodiment of the Ethernet PDU over 5G service may be implemented.

FIG. 6 is a diagram illustrating another exemplary environment 600 in which an embodiment of Ethernet PDU over 5G services may be implemented. According to the example of FIG. 6, Ethernet PDU over 5G service may be implemented using WiFi (e.g., IEEE 802.11).

As illustrated, environment 600 includes hosts 142, UE/CPE 150-1 through 150-n, UPF 210, and customer data center 220. UE/CPEs 150 may be installed at different locations that can be accessed hosts 142 associated with a customer that operates data center 220. In the example of FIG. 6, UE/CPE 150 may include a WiFi Access Point (AP) 605 that may be used to terminate WiFi radio signals. UPF 210 may be associated with a private APN for a corporate customer operating data center 220 and may include an Ethernet frame forwarding unit 610 to send Ethernet WiFi frames to data center 220. Data center 220 may include a WiFi Base Band Unit (BBU) 620.

WiFi Access Point 605 may be installed as a Remote Radio Head (RRH) on UE/CPE 150 at a user site (e.g., a home or remote office for an employee of the corporate customer operating data center 220). WiFi Access Point 605 may broadcast a corporate 802.11 service set identifier (SSID) of the customer. WiFi BBU 620 may be hosted at the remote data center 220, as shown in FIG. 6.

WiFi Access Point 605 may terminate the radio signals from hosts 142 and forward the 802.11 Ethernet WiFi frames to the remote BBU 620 via UPF 210. In contrast with a conventional WiFi access point, WiFi Access Point 605 may demodulate (and modulate) WiFi signals to extract a digital Ethernet frame, but may not perform user authentication and extraction of user data. UPF 210 may receive the Ethernet WiFi frames from UE/CPE 150 via 5G-NR interface (e.g., using wireless communication link 162 to access device 112 and wired backhaul communications link 164 to UPF 210), and Ethernet frame forwarding unit 610 may use a MPLS tunnel with a Layer 2 security protocol, such as Media Access Control Security (MACsec) over Internet to forward the Ethernet frames to BBU 620.

BBU 620 may manage the user authentication, decryption/encryption, and data extraction for signals to/from hosts 142, as in the traditional deployment of WiFi in an enterprise environment. Thus, the Ethernet PDU over 5G connection 162/164 may only forward the WiFi Ethernet based frames between BBU 620 and UE/CPE 150.

In the example of FIG. 6, the UE/CPE 150 provides Layer 2 function only, as far as the egress towards the 5G core network (e.g., core network 130/UPF 210) is concerned. UE/CPE 150 additionally hosts local WiFi radio termination functionality. UE/CPE 150 may be an inexpensive and cost effective solution. Furthermore, the Ethernet PDU over 5G service in FIG. 6 eliminates the need for virtual private network (VPN) connectivity to a corporate/enterprise head-end network (such as data center 220).

Figure 7:
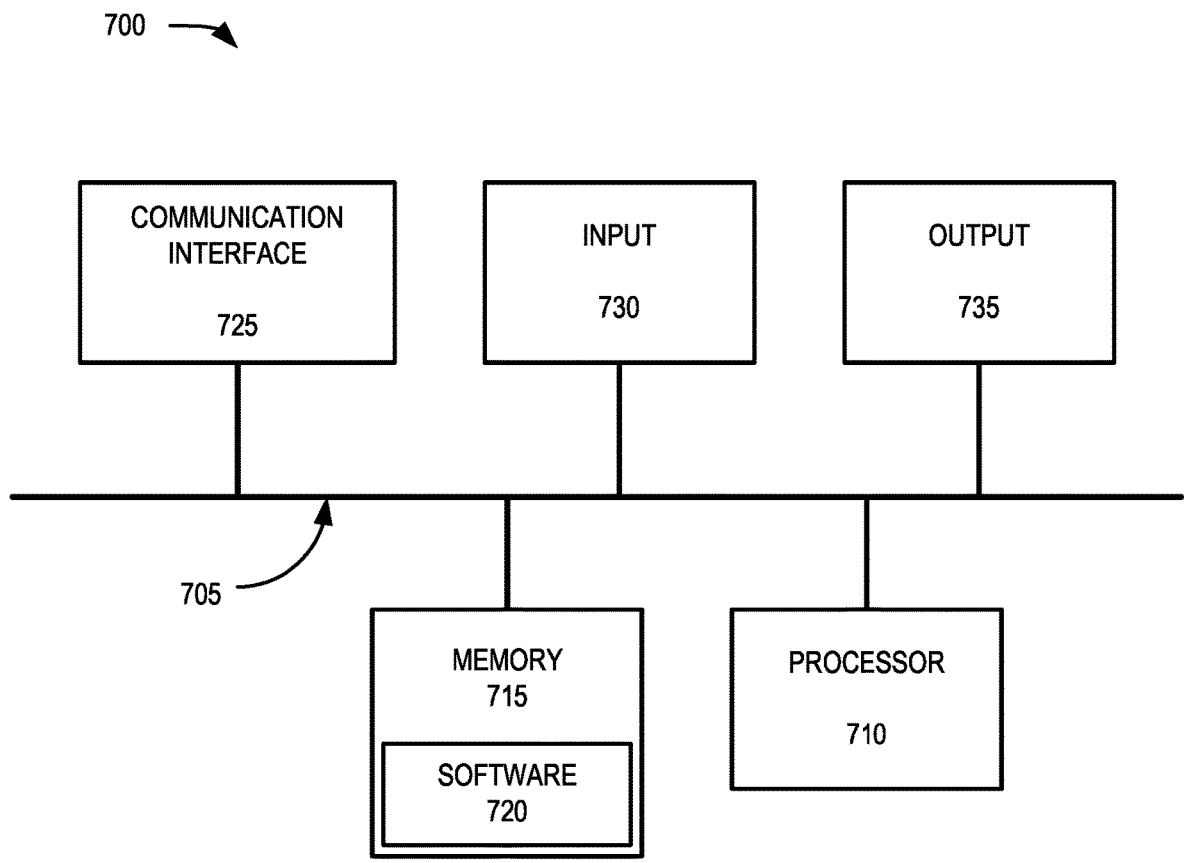
FIG. 7 is a diagram illustrating exemplary components of a device that may correspond to one or more of the devices illustrated and described herein.

FIG. 7 is a diagram illustrating exemplary components of a device 700 that may be included in one or more of the devices described herein. For example, device 700 may correspond to access device 112, external device 122, core device 132, host 142, UE/CPE 150, home UPF 210, data center 220, application servers 222, and/or other types of devices, as described herein. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation, or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, learning, model-based, etc.

Memory/storage 715 includes one or multiple memories and/or one or multiple other types of storage mediums. For example, memory/storage 715 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 715 may include drives for reading from and writing to the storage medium. Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to UPF 210, software 720 may include an application that, when executed by processor 710, provides a function and/or a process of the Ethernet PDU over 5G service, as described herein. Software 720 may also include firmware, middleware, microcode, hardware description language (HDL), and/or other form of instruction. Software 720 may also be virtualized. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, application programming interface (API), etc.). Communication interface 725 may be implemented as a point-to-point interface, a service-based interface, or a reference interface, for example.

Input 730 permits an input into device 700. For example, input 730 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 735 permits an output from device 700. For example, output 735 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 700 may be implemented in the same manner. For example, device 700 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 120) and/or another type of network (e.g., access network 110, core network 130, etc.). Thus, network devices described herein may be implemented as device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 may cause processor 710 to perform a function or a process described herein. Alternatively, for example, according to other implementations, device 700 performs a function or a process described herein based on the execution of hardware (processor 710, etc.).

Figure 8:
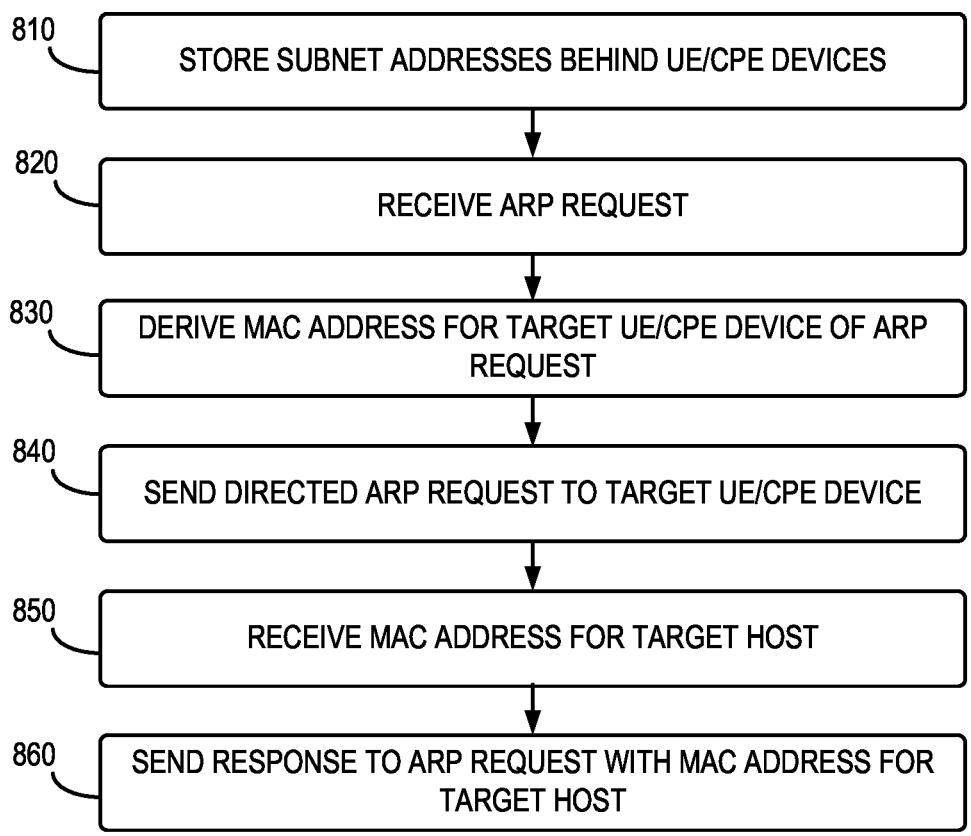
FIG. 8 is a flow diagram illustrating an exemplary process of an embodiment of the Ethernet PDU over 5G service.

FIG. 8 illustrates a process for implementing an Ethernet PDU over 5G service, according to an implementation described herein. In one implementation, process 800 may be implemented by UPF 210. In another implementation, process 800 may be implemented by UPF 210 in conjunction with one or more other network devices in network environment 200.

Process 800 may include storing addresses of advertised subnets located upstream with respect to multiple UE/CPE devices (block 810). For example, UE/CPE devices 150 may advertise to UPF 210 addresses for subnets 230 located upstream from each respective UE/CPE device 150. Using the advertisements, UPF 210 may store subnet table 212 that correlates a MAC address of each of the multiple UE/CPE devices to one or more subnet addresses.

Process 800 may further include receiving an ARP request (block 820) and deriving, a MAC address for a target UE/CPE device servicing the host address (block 830). For example, UPF 210 may receive an ARP request from UE/CPE device 150. The ARP request may be received over a data link layer (Layer 2) and may indicate an IP address for a target host of a data flow. UPF 210 may derive a MAC address for the IP address of the target host using Subnets to UE/CPE table 212.

Process 800 may also include sending a directed ARP request to the target UE/CPE device (block 840), receiving a MAC address for the target host (block 850), and sending a response to the ARP request with the target MAC address (block 860). For example, using the MAC address derived from table 212, UPF 210 may provide a directed ARP request (e.g., ARP request 308) to the target UE/CPE 150. In response to the ARP request, the target UE/CPE 150 may provide to UPF 210 the target MAC address for host 142. Having obtained the target MAC for host 142, UPF 210 may forward the MAC address of target host 142 to the requesting UE/CPE 150/host 142.

Although FIG. 8 illustrates an exemplary embodiment of a process of the Ethernet PDU over 5G service, according to other exemplary scenarios, the Ethernet PDU over 5G service may perform additional operations, fewer operations, and/or different operations than those illustrated and described. For example, Ethernet PDU over 5G service may additionally include VLAN-IDs advertised by UE/CPE devices 150 and associated with data centers for different customers. According to other exemplary embodiments, the Ethernet PDU over 5G service may store data (e.g., table 214) to simplify/reduce signals for similar ARP requests.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 710) of a device. A non-transitory storage medium includes one or more of the storage mediums described in relation to memory 715.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
    storing, by a network device in a core network, addresses of advertised subnets associated with multiple user equipment or customer premises equipment (UE/CPE) devices in a subnet table that correlates a Media Access Control (MAC) address of each of the multiple UE/CPE devices to one or more subnet addresses,
    receiving, by the network device, an allocation and retention priority (ARP) request, wherein the ARP request is received over a data link layer and indicates an Internet Protocol (IP) address for a target host of a data flow;
    determining, by the network device and based on the subnet table and the IP address, a MAC address of a UE/CPE device of the multiple UE/CPE devices servicing the host address;
    sending, by the network device and using the MAC address, a directed ARP request to the UE/CPE device;
    receiving, by the network device and from the UE/CPE device, a target MAC address for the target host; and
    sending, by the network device, a response to the ARP request with the target MAC address.

2. The method of claim 1, further comprising:
    receiving, by an access device and via a wireless link, an Ethernet frame from the UE/CPE device directed to the MAC address for the target host.

3. The method of claim 1, further comprising:
    receiving, from the multiple UE/CPE devices, control plane signals indicating the subnet addresses associated with each of the multiple UE/CPE devices.

4. The method of claim 1, wherein the UE/CPE device services multiple customers.

5. The method of claim 1, wherein the network device includes a user plane function (UPF) associated with a private access point name (APN).

6. The method of claim 1, wherein the network device includes a dedicated MAC address associated with a customer.

7. The method of claim 1, wherein the UE/CPE device does not support Layer 3 protocols.

8. The method of claim 1, further comprising:
    storing, by the network device, the target MAC address associated with the IP address for the target host.

9. A network device comprising:
    a processor configured to:
        store addresses of advertised subnets associated with multiple user equipment or customer premises equipment (UE/CPE) devices in a subnet table that correlates a Media Access Control (MAC) address of each of the multiple UE/CPE devices to one or more subnet addresses,
        receive an allocation and retention priority (ARP) request, wherein the ARP request is received over a data link layer and indicates an IP address for a target host of a data flow;
        determine, based on the subnet table and the IP address, a MAC address of a UE/CPE device of the multiple UE/CPE devices servicing the host address;
        send, using the MAC address, a directed ARP request to the UE/CPE device;
        receive, from the UE/CPE device, a target MAC address for the target host; and
        send a response to the ARP request with the target MAC address.

10. The network device of claim 9, wherein the processor is further configured to:
    receive an Ethernet frame directed to the MAC address for the target host, wherein the Ethernet frame is provided from the UE/CPE device to an access device via a wireless cellular connection.

11. The network device of claim 9, wherein the UE/CPE device services multiple subnets for the same customer.

12. The network device of claim 9, wherein the network device includes a user plane function (UPF) of a core network.

13. The network device of claim 12, wherein the UPF is assigned a dedicated MAC address.

14. The network device of claim 9, wherein the processor is further configured to:
    store the target MAC address associated with the IP address for the target host.

15. The network device of claim 9, wherein the UE/CPE device services multiple hosts for a single customer.

16. A non-transitory computer-readable storage medium storing instructions executable by a processor of a network device, which when executed cause the network device to:
    store addresses of advertised subnets associated with multiple user equipment or customer premises equipment (UE/CPE) devices in a subnet table that correlates a Media Access Control (MAC) address of each of the multiple UE/CPE devices to one or more subnet addresses;
    receive an allocation and retention priority (ARP) request, wherein the ARP request is received over a data link layer and indicates an IP address for a target host of a data flow;
    determine, based on the subnet table and the IP address, a MAC address of a UE/CPE device of the multiple UE/CPE devices servicing the host address;
    send, using the MAC address, a directed ARP request to the UE/CPE device;
    receive, from the UE/CPE device, a target MAC address for the target host; and
    send a response to the ARP request with the target MAC address.

17. The non-transitory computer-readable storage medium of claim 16, wherein the instructions further cause the network device to:
    receive, from the multiple UE/CPE devices, advertisements for the subnet addresses associated with each of the multiple UE/CPE devices.

18. The non-transitory computer-readable storage medium of claim 16, wherein the instructions further cause the network device to:

receive an Ethernet frame directed to the MAC address for the target host, wherein the Ethernet frame is provided from the UE/CPE device to an access device via a wireless cellular connection.

19. The non-transitory computer-readable storage medium of claim 16, wherein the network device includes a user plane function (UPF) of a core network.

20. The non-transitory computer-readable storage medium of claim 19, wherein the UPF and each of the multiple UE/CPE devices have a dedicated MAC address.

\* \* \* \* \*